United States Patent [19]
Tomiyama et al.

[11] Patent Number: 5,521,762
[45] Date of Patent: May 28, 1996

[54] METHOD FOR PRODUCING AN OBJECTIVE LENS ACTUATOR HAVING ELASTIC SUPPORTS

[75] Inventors: Takamichi Tomiyama; Koji Mitsumori; Keiichi Shibata, all of Chiba, Japan

[73] Assignee: Sony Corporation, Tokyo, Japan

[21] Appl. No.: 326,693

[22] Filed: Oct. 20, 1994

[30]  Foreign Application Priority Data

Oct. 25, 1993  [JP]  Japan .................................. 5-288680

[51] Int. Cl.$^6$ ...................................... G02B 7/02
[52] U.S. Cl. ......................... 359/814; 359/813; 359/819; 359/824
[58] Field of Search .................................. 359/814, 823, 359/824, 813, 811, 819; 369/44.15, 44.16

[56]  References Cited

U.S. PATENT DOCUMENTS

| | | | |
|---|---|---|---|
| 4,750,164 | 6/1988 | Nose | 359/814 |
| 4,882,723 | 11/1989 | Van Rosmalen | 359/824 |
| 5,018,836 | 5/1991 | Noda | 359/814 |
| 5,124,965 | 6/1992 | Mizuno | 369/44.15 |
| 5,216,653 | 6/1993 | Ohkawa | 369/44.15 |
| 5,264,968 | 11/1993 | Masunaga | 359/824 |

FOREIGN PATENT DOCUMENTS

0510652A1  10/1992  European Pat. Off. .......... G11B 7/09

OTHER PUBLICATIONS

Patent Abstracts of Japan, vol. 17, No. 366(P–1571) Jul. 9, 1993 and JP–A–05 054 425 (Sony Corp.) Mar. 5, 1993—Abstract.

*Primary Examiner*—Georgia Y. Epps
*Assistant Examiner*—Ricky Mack
*Attorney, Agent, or Firm*—Limbach & Limbach; W. Patrick Bengtsson

[57]  ABSTRACT

A method is provided for producing an objective lens actuator in which a first resin portion which is a stationary portion and a second resin portion which is a movable portion on which an objective lens is to be mounted are integrally formed to plate-like bases in which a plurality of elastic support portions for movably supporting the movable portion relative to the stationary portion in a direction of an optical axis of the objective lens are formed in parallel with each other, so that the first resin portion and the second resin portions are connected to each other by the elastic support portions. At the same time, connecting portions provided between each of the elastic support portions and each plate-like base portion are formed so as to not to overlap each other as viewed in the direction of the optical axis of the objective lens. The plurality of elastic support portions are cut away from the bases at the connecting portions.

7 Claims, 5 Drawing Sheets

METHOD FOR PRODUCING AN OBJECTIVE LENS ACTUATOR HAVING ELASTIC SUPPORTS

BACKGROUND

1. Field of the Invention

The present invention relates to a method for producing an objective lens actuator. More particularly, the present invention relates to a method for producing an objective lens actuator having a plurality of elastic support portions.

2. Background of the Invention

An optical pickup apparatus is used to reproduce or record an information signal of, for example, a so-called compact disc (CD) or a magneto-optical disc. The optical pickup apparatus includes a semiconductor laser device used as a light source, an objective lens, an optical system and a photodetector. A light beam emitted from the semiconductor laser device is converged on a recording surface of the optical disc through the optical system by the objective lens. The light beam reflected from the optical disc is separated from the light beam emitted from the semiconductor laser device and is introduced into the photodetector by the optical system. A position of the objective lens in the optical axial direction is adjusted so that the light beam emitted from the semiconductor laser device may track a displacement of the optical disc in a direction perpendicular to a surface of the optical disc, which displacement is generated by a warpage or the like of the optical disc, and the light beam is focused on the recording surface of the optical disc. At the same time, a position of the objective lens in a direction perpendicular to the optical axis of the objective lens is adjusted so that a position of a spot, on the optical disc, of the light beam emitted from the semiconductor laser device may track an eccentricity of the optical disc or a serpentine motion of a track formed on the optical disc. The focus position of the light beam emitted from the semiconductor laser device and the spot position on the recording surface of the optical disc may be performed by adjusting the position of the objective lens in the optical axial direction and the position of the objective lens in the direction perpendicular to the optical axis. An electromagnetic drive type actuator is used for the positional adjustment of the objective lens.

The actuator includes a bobbin on which the objective lens is mounted, a plurality of elastic support members and a drive unit for generating a drive force. The bobbin is supported by the elastic support members so that the position of the objective lens in the optical axis of the objective lens, i.e., the focus position, and the position of the objective lens in the direction perpendicular to the optical axis of the objective lens, i.e., the tracking position may be adjusted relative to the stationary portion. An example of the actuator will be explained with reference to FIG. 1.

In FIG. 1, the actuator 1 includes a lens holder 2, a coil bobbin 3, a plurality of elastic support members 4a, 4b, 4c and 4d, a base 5 and a mount portion 6. An opening to which the coil bobbin 3 is to be mounted and a recess portion to which the objective lens 2a is to be mounted are formed in the lens holder 2. A hole through which the light beam emitted from the semiconductor laser device and the reflected light beam from the recording surface of the optical disc will pass is formed in a bottom of the recess portion. The objective lens 2a is mounted on the recess portion of the lens holder 2 by adhesives or the like. The lens holder 2 is supported to the elastic support members 4a, 4b, 4c and 4d so as to be movable in a focusing direction Fcs and a tracking direction Trk as desired. An opening portion through which a magnetic circuit of the base 5 to be described later is inserted is formed in the coil bobbin 3. At the same time, a focusing coil 3a and a plurality of tracking coils 3b and 3b are provided on the coil bobbin 3. The focusing coil 3a is wound around an axis in parallel with the optical axis of the objective lens 2a. The tracking coils 3b and 3b are each formed by winding coils in an elliptical shape or a rectangular shape and are mounted on one side of the focusing coil 3a. An upper surface of the coil bobbin 3 is covered by a cover 3c. The cover 3c may be formed to have a closed magnetic path as well as a yoke portion to be described later. The coil bobbin 3 is mounted on the opening portion formed in the lens holder 2 with the focusing coil 3a and the tracking coils 3b and 3b being mounted on the coil bobbin 3. The plurality of elastic support members 4a, 4b, 4c and 4d are each formed by elastic members such as leaf springs or the like. The plurality of elastic support members 4a, 4b, 4c and 4d are mounted between the lens holder 2 and the mount portion 6 by adhesives, soldering or the like so as to be in parallel to each other. Mounted on the base 5 are a projection 7 on which the mount portion 6 is mounted, and a pair of yoke portions 8a and 8b which face to each other to form a magnetic circuit. Under the condition that the lens holder 2 and the mount portion 6 are coupled with each other by the plurality of elastic support members 4a, 4b, 4c and 4d, the mount portion 6 is mounted on the projection 7 by adhesives or the like. At this time, the mount portion 6 is mounted on the projection 7 so as not to slant the optical axis of the objective lens 2a. A permanent magnet 9 is mounted on a surface, facing the yoke portion 8a, of the yoke portion 8b. The pair of yoke portions 8a and 8b and the magnet 9 constitute the magnetic circuit. Under the condition that the mount portion 6 is mounted on the projection 7, the focusing coil 3a and the tracking coils 3b and 3b mounted on the coil bottom 3 is inserted into a gap between the magnet 9 and one of the yoke portions 8a. At the same time, the other yoke portion 8b and the magnet 9 are inserted into the opening portion.

In the thus constructed actuator 1, currents are supplied to the focusing coil 3a and the tracking coils 3b and 3b on the basis of a focusing servo signal and a tracking servo signal, respectively. As a result, the lens holer 2, i.e., the objective lens 2a is driven in the focusing direction Fcs and the tracking direction Trk by a DC magnetic field of the magnetic circuit and an alternating magnetic field generated from the focusing coil 3a and the tracking coils 3b and 3b.

In the actuator, upon mounting the elastic support members 4a, 4b, 4c and 4d onto the holder 2, as shown in FIG. 2, the four elastic support members 4a, 4b, 4c and 4d are separated, in advance, apart from an elastic body which forms a the base. A first end of each of the plural separated elastic support members 4a, 4b, 4c and 4d is mounted on an associated one of projections 2b, 2c, 2d and 2e for mounting the lens holder 2 by adhesives, soldering or the like as shown in FIGS. 1 and 2, whereas a second end thereof is mounted on an associated one of projections 6a, 6b, 6c and 6d for mounting the mount portion 6 in the same method.

In addition to the above-described method for mounting the elastic support members 4a, 4b, 4c and 4d, the following method may be considered. Before the plurality of elastic support members 4a, 4b, 4c and 4d are separated away from the plate-like member which forms the base, i.e., under the condition that each of the elastic support members 4a, 4b, 4c and 4d is integral with the member which forms the base, the lens holder 2 and the mount portion 3 are mounted on a predetermined position of the plate-like member. The predetermined position is a position where the lens holder 2 and the mount portion 6 are coupled by the elastic support members 4a, 4b, 4c and 4d as shown in FIG. 1, when each of the elastic support members 4a, 4b, 4c and 4d is separated away from the plate-like member after the lens holder 2 and the mount portion 3 have been mounted. Under this condition, the laser beam is irradiated thereonto, so that each of the elastic support members 4a, 4b, 4c and 4d is cut and separated away from the plate-like member.

However, in order to mount each of the elastic support members 4a, 4b, 4c and 4d onto the lens holder 2 and the mount portion 6 under the condition that each of the elastic support members 4a, 4b, 4c and 4d is separated, in advance, away from the plate-like member which forms the base, the elastic support members 4a, 4b, 4c and 4d must be mounted on the lens holder 2 and the mount portion 6 one by one. For this reason, it is impossible to automate the assembling work, and there would be a fear that the elastic support member would be bent in assembling. The working efficiency is very low, and the parts control would be troublesome. Furthermore, it would be impossible to mount each of the elastic support members 4a, 4b, 4c and 4d onto the lens holder 2 and the mount portion 6 with a parallelism between the elastic support members 4a, 4b, 4c and 4d, resulting in likelihood of generation of twist thereof. If the twist would be generated in the elastic support members 4a, 4b, 4c and 4d, the optical axis of the objective lens 2a would be slanted and the function of the actuator would not be sufficiently exhibited. If the optical axis of the objective lens 2a would be inclined, the light beam outputted from the objective lens 2a would not be correctly incident onto the recording surface of the optical disc, and the reflected light beam from the recording surface of the optical disc could not be introduced into the optical pickup apparatus.

Also, in the above-described method in which the elastic support members are cut by the laser beam after the lens holder 2 and the mount portion 6 have been mounted on the plate-like member in advance, a spark would be generated upon the cutting operation by the laser beam, so that the generated spark would be applied to the elastic support members 4a, 4b, 4c and 4d, the lens holder 2 and the mount portion 6. In the case where the spark would be applied to the elastic support members 4a, 4b, 4c and 4d, a deformation or the like would be generated where the spark is applied. As a result, the displacement of the elastic support members 4a, 4b, 4c and 4d would be prevented in the focusing direction Fcs and the tracking direction Trk and in addition, the focusing servo or the tracking servo would be likely to be offset. In the case where the spark is applied to the lens holder 2, the deformation is generated in the lens holder 2, resulting in difficulty in mounting the objective lens 2a thereon, or in a disadvantage in which the optical axis of the mounted objective lens 2a would be inclined.

SUMMARY OF THE INVENTION

It is, therefore, an object of the present invention to provide an objective lens actuator which resolves the above-mentioned problems.

According to one aspect of the present invention, there is provided a method for producing an objective lens actuator, comprising the following steps of: providing a first portion which is a stationary portion and a second portion which is a movable portion and on which an objective lens is to be mounted, to a base where a plurality of elastic support portions are formed for movably support the movable portion relative to the stationary portion at least in an optical axis direction of the objective lens, so that the first portion and second portion are connected to each other by the plurality of elastic support portion; and cutting the plurality of elastic support portions from the base so that the cut positions for the plurality of elastic support portions are different from each other.

According to another aspect of the invention, there is provided a method for producing an objective lens actuator, comprising the following steps of: arranging at least two plate-like bases in parallel with each other, each of the plate-like base including a frame portion having a rectangular opening portion, at least two am portions provided in parallel with each other within the opening portion, and a plurality of connecting portions for connecting each of opposite ends of each of the arm portions and the frame portion with each other, each of the arm portions being formed so as to traverse the opening portion; forming a first resin portion in a direction perpendicular to a longitudinal direction of the arm portions between the two arm portions, and a second resin portion in which an objective lens is mounted at a position away from the first resin portion; and cutting each of the arm portions away from the frame portion at the connecting portions and positions which are different from each other.

According to the present invention, each elastic support portion, i.e., each arm portion is cut away from the base at different positions, whereby it is possible to cut at once the portion which will become the stationary portion and the portion which will become the movable portion away from the base under the connected condition by the respective elastic support portions, i.e., arm portions.

BRIEF DESCRIPTION OF THE DRAWINGS

The invention will be more readily understood with reference to the accompanying drawings, wherein.

DESCRIPTION OF THE INVENTION

A method for producing an objective lens actuator according to the present invention will now be described with reference to the accompanying drawings.

Figure 1:
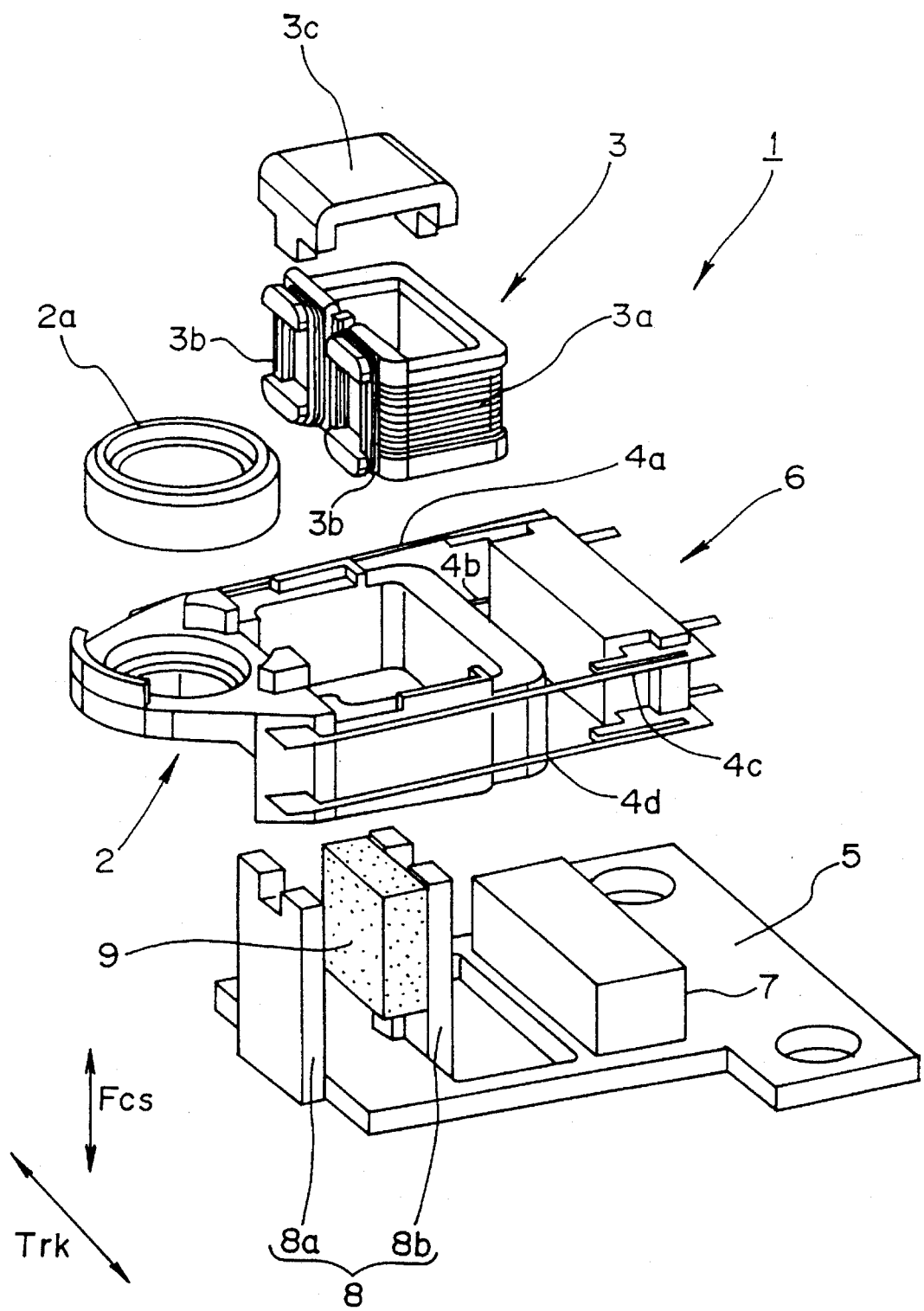
FIG. 1 is an exploded perspective view showing a structure of an objective lens actuator.
Figure 2:
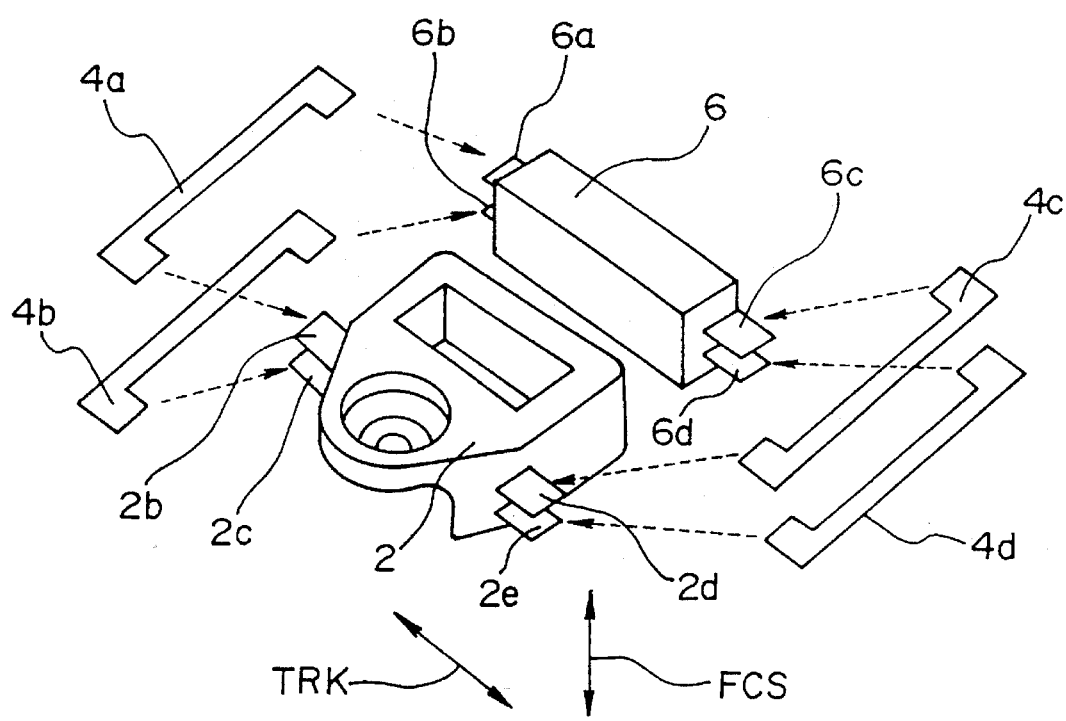
FIG. 2 is an exploded perspective view showing a lens holder.

The actuator according to the present invention is of the same type as that of the actuator shown in FIG. 1, i.e., an electromagnetic drive type actuator used in an optical pickup apparatus for recording and reproducing an information signal of an optical disc as a recording medium. The actuator according to the present invention includes a lens holder 50 and a stationary portion 52. In the lens holder 50, there are formed a recess portion 100 in which an objective lens (not shown) for converging a light beam emitted from a light source, on a recording surface of the optical disc and an opening portion on which a coil bobbin having a focusing coil and a tracking coil is mounted in the same way as in the optical pickup apparatus described above. A through-hole through which the light beam is to pass is formed in a bottom of the recess portion 100. The lens holder 50 and the stationary portion 52 are coupled with each other by a plurality of elastic support portions 60, 62, 70 and 72. The coil bobbin (not shown) is mounted on the opening portion of the lens holder 50 in the same way as in FIG. 1.

Figure 3:
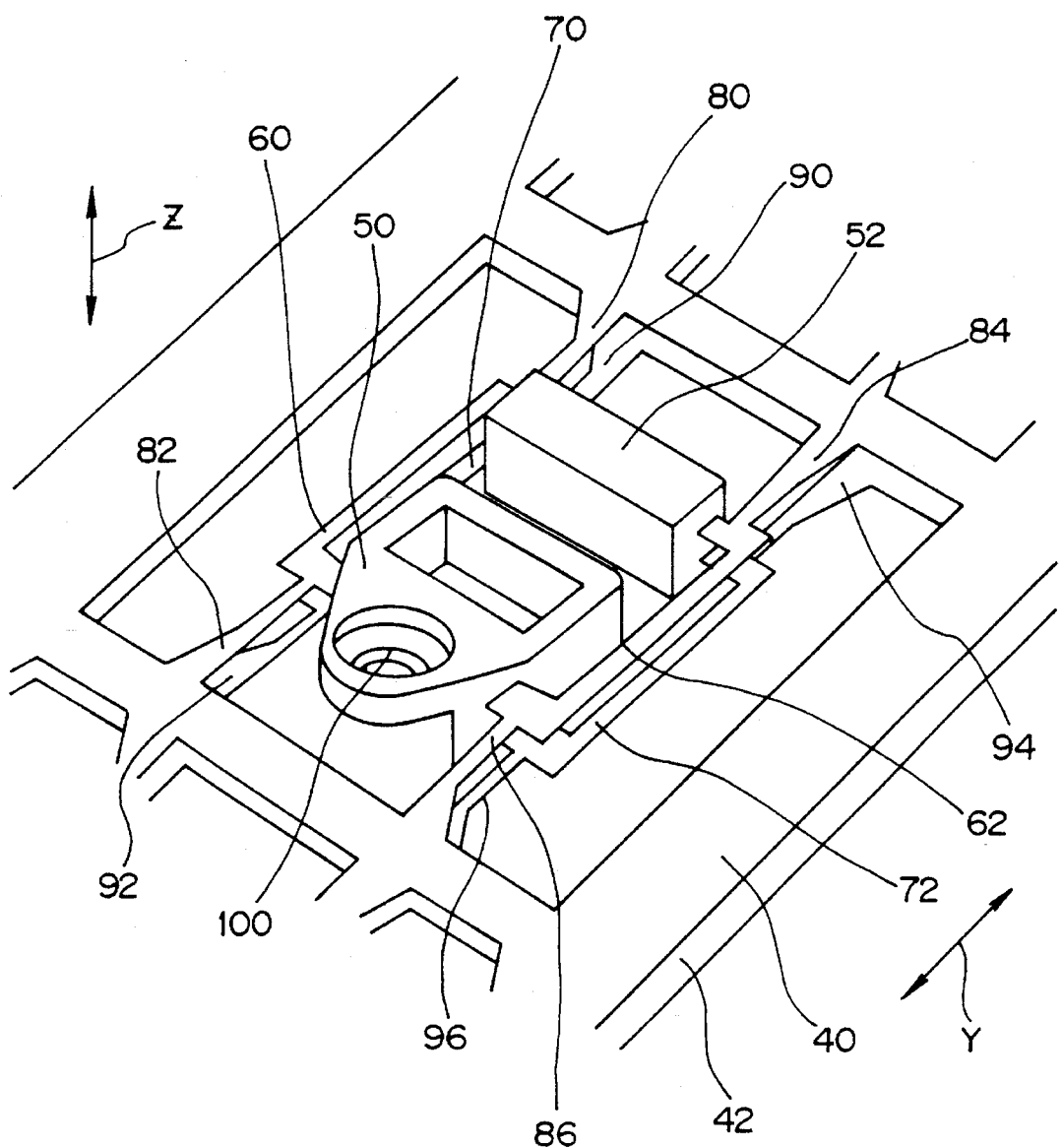
FIG. 3 is a perspective view for illustrating a cutting method of an objective lens actuator according to the invention.
Figure 4:
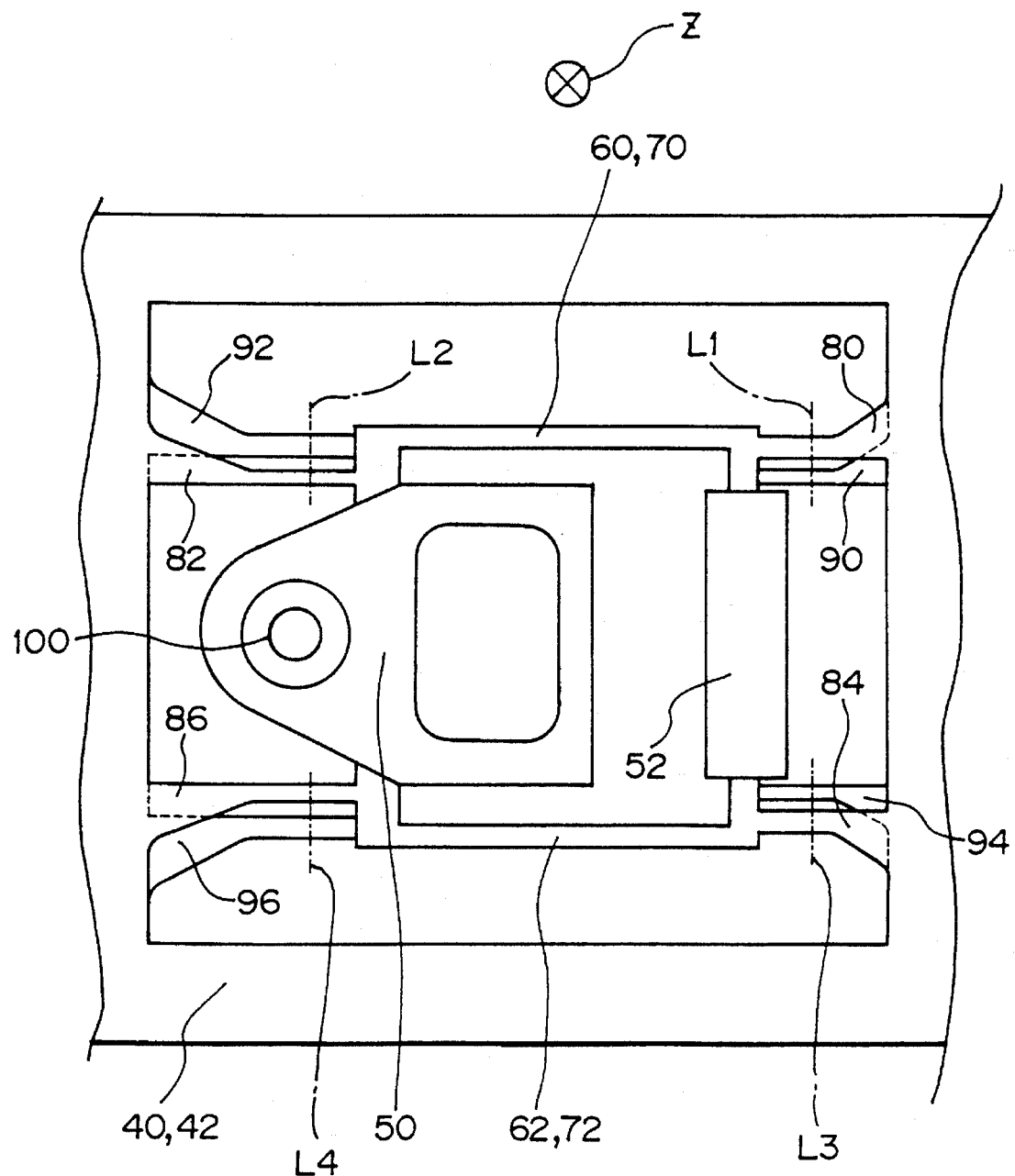
FIG. 4 is a plan view for illustrating the cutting method of the objective lens actuator shown in FIG. 3.

Plate-like members 40 and 42 which form bases for the plurality of elastic support portions 60, 62, 70 and 72 are made of phosphorus bronze, beryllium copper, stainless steel or the like. The plate-like members 40 and 42 are arranged in parallel to each other and are formed by etching or pressing as shown in FIGS. 3 and 4. Namely, the plate-like members 40 and 42 have frame portions, strip-shaped elastic support portions 60, 62, 70 and 72 and connecting portions 80, 82, 84, 86, 90, 92, 94 and 96 for connecting the respective elastic support portions 60, 62, 70 and 72 and the frame portion to each other. Tongue portions which become a mount portion to the lens holder 50 or the stationary portion 52 and which are wider than the other portions is formed at each of the elastic support portions 60, 62, 70 and 72 at portions that become both ends by cutting the tongue portions from the plate-like members 40 and 42. One end of the elastic support member 60 is coupled to the frame portion by the connecting portion 80, and the other end thereof is coupled to the frame portion by the connecting portion 82. One end of the elastic support portion 62 is connected to the frame portion by the connecting portion 84 and the other end thereof is connected to the frame portion by the connecting portion 86. Also, the elastic portion 62 is connected so as to be parallel with the elastic support portion 80. In the same way, the other elastic support portions 70 and 72 are connected so as to be parallel with each other by the respective connecting portions 90, 92, 94 and 96. Incidentally, in FIGS. 3 and 4, a part of the plate like members 40 and 42 is shown. Actually, the continuous frame portion and a plurality elastic support portions are repeatedly formed also in the forward and rearward directions indicated by the double-headed arrow Y in FIG. 3, and lens holders 60 and stationary portions 52 are provided therein.

In the drawings, each of the elastic support portions 60, 62, 70 and 72 is shown in the form of a leaf spring. It is preferable that each elastic support portion be 50 to 100 μm thick and 0.1 to 0.3 mm wide. By forming each elastic support portions 60, 62, 70 and 72 so as to have such a size, in the same way as in the case where the elastic support portion is formed by a wire-like elastic member, it is possible to well drive the lens holder 50 in the focusing direction Fcs and the tracking direction Trk without any limitation of the direction in elastic displacement of the respective elastic support portions 60, 62, 70 and 72 per se.

At least under the condition that the lens holder 50 and the stationary portion 52 are mounted on the plate-like members 40 and 42, the elastic support portion 60 and the elastic support portion 70 are located to overlap each other as viewed in a direction of a Z-axis in FIG. 4. Of course, also under the condition prior to the mounting the lens holder 50 and the stationary portion 52 onto the plate-like members 40 and 42, the elastic support portion 60 and the elastic support portion 70 may be located to overlap each other as viewed in the direction of Z-axis in FIG. 4. In the same manner, the elastic support portion 62 and the elastic support portion 72 are located to overlap each other as viewed in the direction of the Z-axis in FIG. 4. However, the connecting portion 80 and the connecting portion are located not to overlap each other as viewed in the direction of the Z-axis in FIG. 4. In the same way, the other connecting portions 82 and 92, 84 and 94 and 86 and 96 are located not to overlap each other, respectively. Incidentally, the elastic support portion 60 and the elastic support portion 62 may be integral with each other within at least one of the lens holder 50 and the stationary portion 52. In the same way, the elastic support portion 70 and the elastic support portion 72 may be integral with each other within the lens holder 50 or the stationary portion 52.

The lens holder 50 and the stationary portion 52 are mounted on the plate-like members 40 and 42 by insert molding, adhesives, thermal caulking or the like. The lens holder 50 and the stationary portion 52 may be formed of synthetic resin such as PPS (polyphenylene sulfide), PBT (polybutylene terephthalate), PC (polycarbonate) or the like. In the present embodiment, the lens holder 50 and the stationary portion 52 are formed through a so-called insert molding. First of all, the plate-like members 40 and 42 which have been formed into a predetermined shape are inserted into molds for injection molding and positioned and retained within the molds. Under this condition, the above-described synthetic resin is injected into the molds to thereby integrally mold the lens holder 50 and the stationary portion 52 with the plate-like members 40 and 42.

A method for cutting the elastic support portions 60, 62, 70 and 72 from the plate-like members 40 and 42 under the condition that the lens holder 50 and the stationary portion 52 are mounted integrally with the plate-like members 40 and 42 will now be described.

In the embodiment of the invention, the elastic support members 60, 62, 70 and 72 are cut away from the plate-like members 40 and 42 at positions L1, L2, L3 and L4 in FIG. 4. Namely, since the respective connecting portions 80, 82, 84, 86, 90, 92, 94 and 96 of the respective elastic support portions 60, 62, 70 and 72 are formed not to overlap each other as mentioned before, it is possible to cut the elastic support portions 60, 62, 70 and 72 away from the plate-like members 40 and 42 at once at the positions indicated by L1, L2, L3 and L4.

Figure 5:
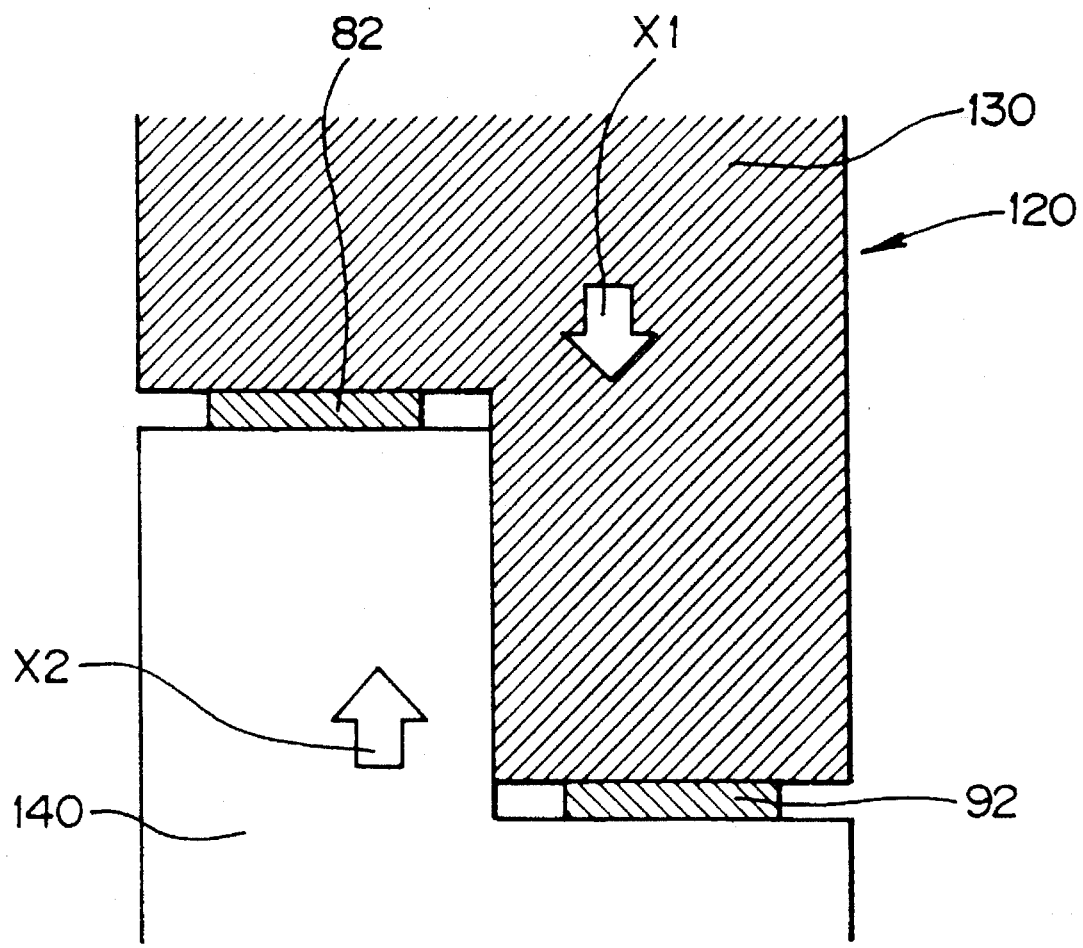
FIG. 5 is a cross-sectional view showing a primary part for illustrating the cutting method of the objective lens actuator according to the invention.

A device shown in FIG. 5 may be used as a cutting apparatus 120 for cutting the elastic support portions 60, 62, 70 and 72 from the plate-like members 40 and 42. The cutting apparatus 120 may be a so-called press machine and is composed of an upper die 130 and a lower die 140. The upper die 130 is driven in a direction indicated by an arrow X1 in FIG. 5 by a drive mechanism (not shown), whereas the lower die 140 is driven in a direction indicated by an arrow X2 in FIG. 5 by a drive mechanism (not shown). Under the condition that the lens holder 50 and the stationary member 52 are integrally formed with the plate-like members 40 and 42 and are positioned within the cutting apparatus 120, the lens holder 50 and the stationary member 52 are held by the upper and lower dies 130 and 140. The positioning of the plate-like members 40 and 42 is performed by engaging positioning pins (not shown), formed in either one of the dies 130 and 140 forming the cutting apparatus 120, with positioning holes (not shown) formed in the plate-like members 40 and 42, for example. Thus, the respective connecting portions 82 and 92 of the plate-like members 40 and 42 are interposed between the dies 130 and 140 as shown in FIG. 5. Under the plate-like members 40 and 42 are positioned and held in place, the upper and lower dies 130 and 140 are moved in opposite directions, i.e., in the directions X1 and X2 as shown in FIG. 5, so that the connecting portions 82 and 92 are cut at the position L2 in FIG. 4 and parts of the elastic support portions 60 and 70 are cut away from the plate-like members 40 and 42. At the same time, the other connecting portions 80, 84, 90, 94 and 96 are cut at the positions L1, L3 and L4 in FIG. 4 and the elastic support portions 60, 62, 70 and 72 are completely cut from the plate-like members 40 and 42.

The objective lens, coil bobbin and the like are mounted on unit composed of the cutaway lens holder 50, stationary portion 52 and elastic support portions 60, 62, 70 and 72 in the same way as in the actuator shown in FIG. 1. The stationary portion of the completely mounted unit is mounted on the base provided with the magnetic circuit. Thereafter, the wiring system for electric power supply is applied to the focusing coil and the tracking coil mounted on the coil bobbin.

As described above, since the connecting portions 80, 84, 86, 90, 92, 94 and 96 are formed not to overlap each other as viewed in the Z-direction in FIG. 4, it is possible to cut the connecting porions away from the plate-like members 40 and 42 at once by the upper and lower dies 130 and 140. Accordingly, in the embodiment of the invention, there is no fear that any spark would be generated in case of the laser beam when the elastic support portions 60, 62, 70 and 72 are cut as mentioned before, and there is no fear that the deformation or the like would be generated in the elastic support portions 60, 62, 70 and 72.

Also, since the respective connecting portions 80, 84, 86, 90, 92, 94 and 96 are formed not to overlap each other, it is possible to easily cut the these portions from the plate-like members 40 and 42 which form the base. It is possible to enhance the working efficiency. It is also possible to automate the cutting work. Furthermore, it is possible to shorten a period of time which is required for the step for integrally forming the lens holder 50 and the stationary portion 52 with the plate-like members 40 and 42 and the step for cutting the elastic support portions 60, 62, 70 and 72 from the plate-like members 40 and 42 at the respective connection portions 80, 84, 86, 90, 92, 94 and 96, i.e., a so-called tact time.

In the foregoing embodiment, the lens holder 50 and the stationary portion 52 are integrally formed in the plate-like members 40 and 42 by the insert molding. However, the invention is not limited thereto. The lens holder 50 and the stationary portion 52 may be mounted on the plate-like members 40 and 42 by adhesives or thermal caulking, and thereafter, the elastic support portions 60, 62, 70 and 72 may be cut from the plate-like members 40 and 42 at the respective connection portions 80, 84, 86, 90, 92, 94 and 96 by the cutting apparatus 120.

Also, in the foregoing embodiment, the method for manufacturing the actuator for driving the objective lens in the focusing direction and the tracking direction has been explained. However, it is possible to apply the invention also to a method for producing an actuator in which the objective lens is driven only in the focusing direction.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method for producing an objective lens actuator, comprising the following steps of:

providing a first portion which is a stationary portion and a second portion which is a movable portion and on which an objective lens is to be mounted, to a base where a plurality of elastic support portions are formed for movably supporting said movable portion relative to said stationary portion at least in an optical axis direction of said objective lens, so that said first portion and second portion are connected to each other by said plurality of elastic support portion; and cutting each of said plurality of elastic support portions from said base at different cut positions.

2. The method according to claim 1, wherein portions, to be cut, of said plurality of elastic support portions are provided for connecting said first and second portions so as not to overlap each other as viewed in the optical axis direction of said objective lens.

3. The method according to claim 1, wherein said plurality of elastic support portions are simultaneously cut away from said base by a press machine.

4. The method according to claim 1, wherein said first portion and said second portion are integrally formed of synthetic resin with said base by insert molding.

5. A method for producing an objective lens actuator, comprising the following steps of:

arranging at least two plate-like members in parallel with each other, each of said plate-like members including a frame portion having a rectangular opening portion, at least two arm portions provided in parallel with each other within said opening portion, and a plurality of connecting portions for connecting each of opposite ends of each of said arm portions and said frame portion with each other, each of said arm portions being formed so as to traverse the opening portion;

forming a first resin portion in a direction perpendicular to a longitudinal direction of said arm portions between said two arm portions, and a second resin portion in which an objective lens is mounted at a position away from said first resin portion; and cutting each of said arm portions away from said frame portion at said connecting portions and positions which are different from each other.

6. The method according to claim 5, wherein said connecting portions are formed so as not to overlap each other as viewed in a direction perpendicular to a planar surface of said plate-like bases.

7. The method according to claim 1, wherein said at least two arm portions are simultaneously cut away from said bases by a press machine.

* * * * *